United States Patent [19]
Hirabayashi

[11] Patent Number: 4,769,994
[45] Date of Patent: Sep. 13, 1988

[54] METHOD AND APPARATUS FOR CONTROLLING A VARIABLE CAPACITY TURBINE OF AN AUTOMOTIVE TURBOCHARGER

[75] Inventor: Yuji Hirabayashi, Zushi, Japan

[73] Assignee: Nissan Motor Co., Ltd., Japan

[21] Appl. No.: 644,338

[22] Filed: Aug. 27, 1984

[30] Foreign Application Priority Data

| Sep. 5, 1983 | [JP] | Japan | 58-162918 |
| Sep. 6, 1983 | [JP] | Japan | 58-163772 |
| Sep. 6, 1983 | [JP] | Japan | 58-163773 |

[51] Int. Cl.⁴ .................................. F02B 37/12
[52] U.S. Cl. ............................................ 60/602
[58] Field of Search ................. 60/600, 601, 602, 603

[56] References Cited

U.S. PATENT DOCUMENTS

| 1,856,024 | 4/1932 | Buchi | 60/603 |
| 4,292,806 | 10/1981 | Moore et al. | 60/600 |
| 4,292,807 | 10/1981 | Rannenberg | 60/601 |
| 4,428,199 | 1/1984 | Moore et al. | 60/600 |
| 4,463,565 | 8/1984 | Rydquist et al. | 60/602 |
| 4,467,607 | 8/1984 | Rydquist et al. | 60/602 |
| 4,477,875 | 10/1984 | Suzuki et al. | 60/603 |
| 4,519,210 | 5/1985 | Iwamoto et al. | 60/602 |

FOREIGN PATENT DOCUMENTS

| 0040814 | 2/1981 | European Pat. Off. |
| 0078054 | 5/1983 | European Pat. Off. |
| 2151658 | 4/1973 | Fed. Rep. of Germany | 60/602 |
| 2391358 | 12/1978 | France |
| 2500061 | 8/1982 | France |
| 2500065 | 8/1982 | France |
| 5350310 | 4/1978 | Japan |
| 146023 | 9/1982 | Japan | 60/602 |
| 107814 | 6/1983 | Japan | 60/603 |
| 176417 | 10/1983 | Japan | 60/602 |
| 2083135 | 3/1982 | United Kingdom |

OTHER PUBLICATIONS

Patent Abstracts of Japan, vol. 7, No. 85 (M-206) [1230], 9th Apr. 1983; & JP-A-58 10 117, (Hitachi Seisakusho K.K.) 20-01-1983.

*Primary Examiner*—Michael Koczo
*Attorney, Agent, or Firm*—Lane & Aitken

[57] ABSTRACT

In order to derive the optimal supercharging pressure, a basic control signal by, which a device which varies the capacity of a turbocharger is controlled, is arranged to increase the supercharge pressure until engine knocking or like undesirable phenomenon occurs, whereafter the throttling provided by the capacity controlling device is incrementally reduced until the phenomenon disappears. Subsequent increases and decreases in the throttling degree holds the supercharge pressure at the optimal level. When acceleration is required, the maximum degree of throttling is induced and held for a time or until an undesirable phenomenon occurs. The hold time may be varied with engine operational parameters such as engine speed.

27 Claims, 12 Drawing Sheets

METHOD AND APPARATUS FOR CONTROLLING A VARIABLE CAPACITY TURBINE OF AN AUTOMOTIVE TURBOCHARGER

BACKGROUND OF THE INVENTION

1. Field of the Invention

The present invention relates generally to an automotive turbocharger and more specifically to an control method (and apparatus) therefor by which optimal performance characteristics can be obtained.

2. Description of the Prior Art

For the purpose of simultaneously promoting both fuel economy and power output, automotive internal combustion engine turbochargers are required to operate over a wide range of engine operating conditions and to produce usable amounts of torque even at low and medium engine speeds. In order to achieve this, it is desirable to design the volute passage formed in the scroll housing to have a configuration which will direct the exhaust gases from the engine to the turbine impeller of the turbocharger so that at low engine speeds the rotational speed of the impeller can be increased rapidly while not inducing high exhaust back pressures during high speed engine operation. However, such a compromise cannot in actual practice be produced. Thus it has been necessary to utilize a small capacity turbine and by-pass exhaust gases around the turbine when there is excessive back pressure in the exhaust manifold of the engine and/or when the turbine impeller speed increases to the point of producing an excessive supercharging pressure in the induction manifold.

However, the use of so called "waste gates" for by-passing the exhaust gases is not desirable from the view point of exhaust gas energy recovery. Thus, it has been proposed to effectively vary the capacity of the turbine by utilizing an arrangement such as illustrated in FIGS. 1 and 2, of the drawings and which is disclosed in detail in Japanese Utility Model Application First Provisional Publication Sho No. 53-50310.

In the above mentioned arrangement, the cross sectional area of the inlet portion or nozzle 1 through which the exhaust gases are introduced into the convolute passage 2 defined within the scroll housing 3, is variable via the use of band-like throttling members and actuator arrangement.

In this arrangement, a first band member 4 is pivotally mounted at its downstream end on the inner wall of the scroll housing 3 while a second member 5 is pivotally connected to the upstream end of the first member 4 through a linkage arrangement 6. The upstream end of the second band-like member 5 is pivotally supported on the scroll housing near the attachement flange 7 thereof. An actuator 8 is operatively connected with the linkage arragement 6 for moving the band members from a home position toward and/or into one wherein they throttle the inlet port 1 of the scroll housing 3 in a manner to increase the velocity of the exhaust gases flowing toward the turbine (not shown).

FIG. 2 shows, in block diagram form, a control arrangement used in conjunction with the above disclosed device. This control arrangement controls actuator 8 in response to a signal generated by a potentiometer 9 which detects the position of an accelerator lever 10, and a voltage signal output by a F/V converter 11 which converts an engine speed signal generated by an engine speed sensor 12 into a corresponding voltage. As shown, these two signals are applied to a function generator 13 which outputs a suitable control signal to the actuator via amplifier 14.

This arrangement however, suffers from a drawback in that the temperature of the air being charged into the engine by the compressor of the turbocharger is not taken into account, and so, even though the same amount of air is being charged into the cylinders, the pressure thereof often tends to become excessive, leading to smoke formation in diesel engines and engine damage in the case of Ottocycle (gasoline) engines.

Accordingly, this arrangement, in order to positively safeguard the engine against excessive supercharging pressures, is arranged so that the actuator moves the throttling arrangement between a fully open position OL (see FIGS. 3 and 4) and a maximum throttling position CL which is selected to provide an adequate safety margin. Thus, when the accelerator lever 10 is moved from position $R_1$ to $R_2$ for example, the control characteristics provided by the above described control arrangement shift from control schedule "a" to schedule "b" as shown in FIG. 3.

Thus, this arrangement encounters the further drawback in that, as shown in FIG. 3, when the accelerator lever is moved in a manner to accelerate the engine, which for the sake of explanation is assumed to be operating in a non-transitory state with the throttling member fully retracted at position "A" (see FIG. 4), because the engine speed does not change immediately, the control arrangement tends to move the throttling member toward a position B' wherein it fully throttles the inlet port. However, because the actuator cannot move the throttling arrangement beyond the CL limit, the optimal acceleration characteristics of the turbocharger turbine in the speed range B - C cannot be realized.

A factor affecting the selection of the above mentioned CL limit is that during acceleration, the load on the engine (viz., the amount of air inducted) is markedly increased, leading to knocking if the pressure and temperature of the air charged into the cylinders is excessive.

A further drawback encountered with the above mentioned system is that during partial load the charging characteristics tend to decrease fuel efficiency.

SUMMARY OF THE INVENTION

It is an object of the present invention to provide an automotive turbocharger control which optimizes the charging pressure under all operating conditions of the engine including transitory modes of operation such as acceleration.

In its broadest aspect, the present invention takes the form of a method of controlling an internal combustion engine turbocharger which includes a volute passage through which exhaust gases flow from an internal combustion engine associated with said turbocharger and means for throttling said passage in a manner to vary the supercharging capacity of said turbocharger, characterized by the steps of: (a) sensing a first engine operational parameter, (b) sensing a second engine operational parameter which varies with the supercharging of said engine, (c) generating a control signal for controlling said throttling means in response to the magnitude of said first paramenter, and (d) modifying said control signal in response to the magnitude of said second parameter.

BRIEF DESCRIPTION OF THE DRAWINGS

The features and advantages of the arrangement of the present invention will be more clearly appreciated from the following description taken in conjunction with the accompanying drawings in which.

DETAILED DESCRIPTION OF THE PREFERRED EMBODIMENTS

Figure 1:
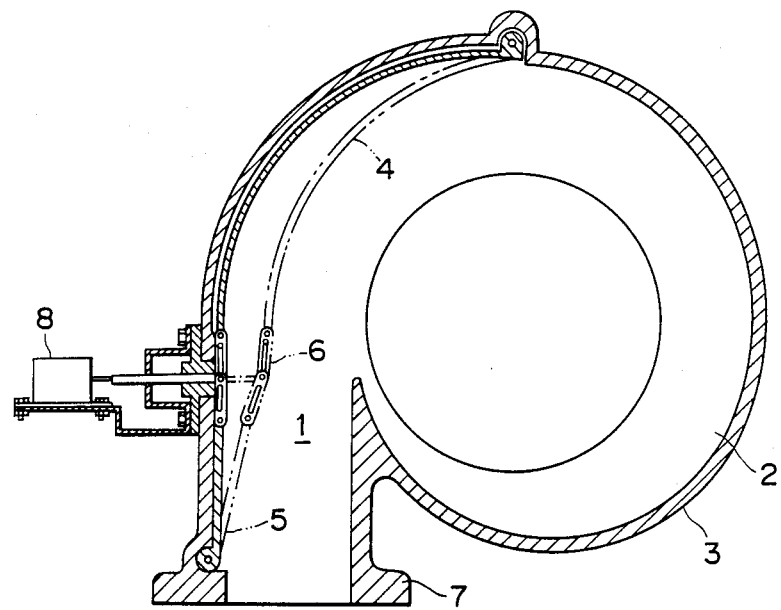
FIG. 1 is a sectional side elevation of prior art turbocharger arrangement discussed in the opening paragraphs of the present invention disclosure.
Figure 2:
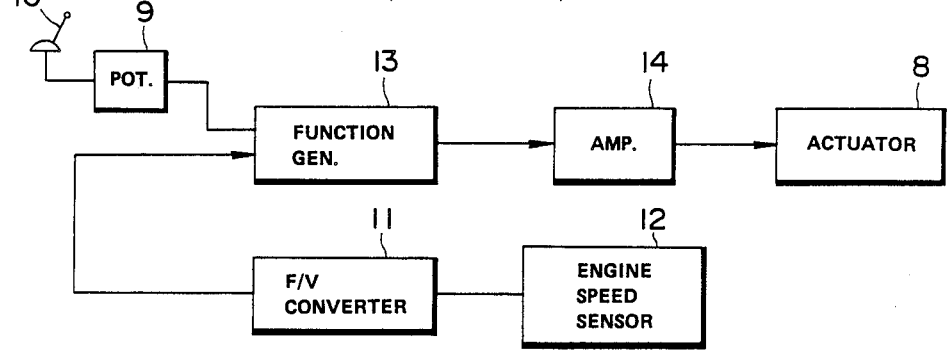
FIG. 2 is a block diagram showing the control system used in conjunction with the FIG. 1 arrangement.
Figure 3:
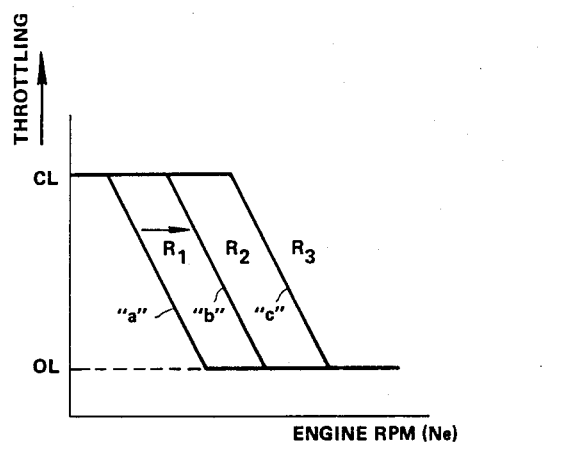
FIGS. 3 and 4 are graphs showing the operation characteristics of the arrangement shown in FIGS. 1 and 2.
Figure 4:
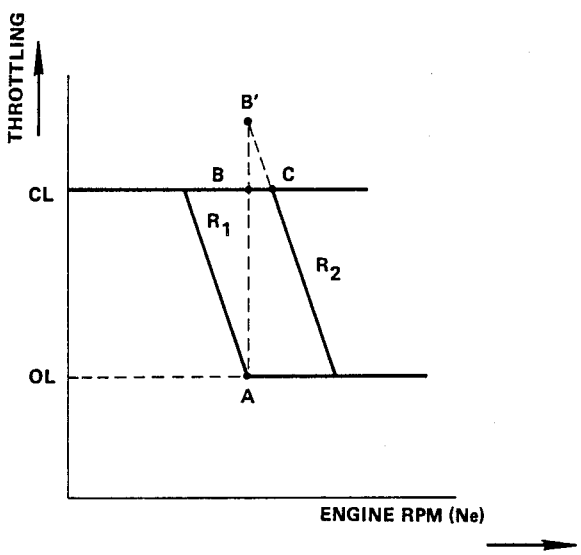
Figure 5:
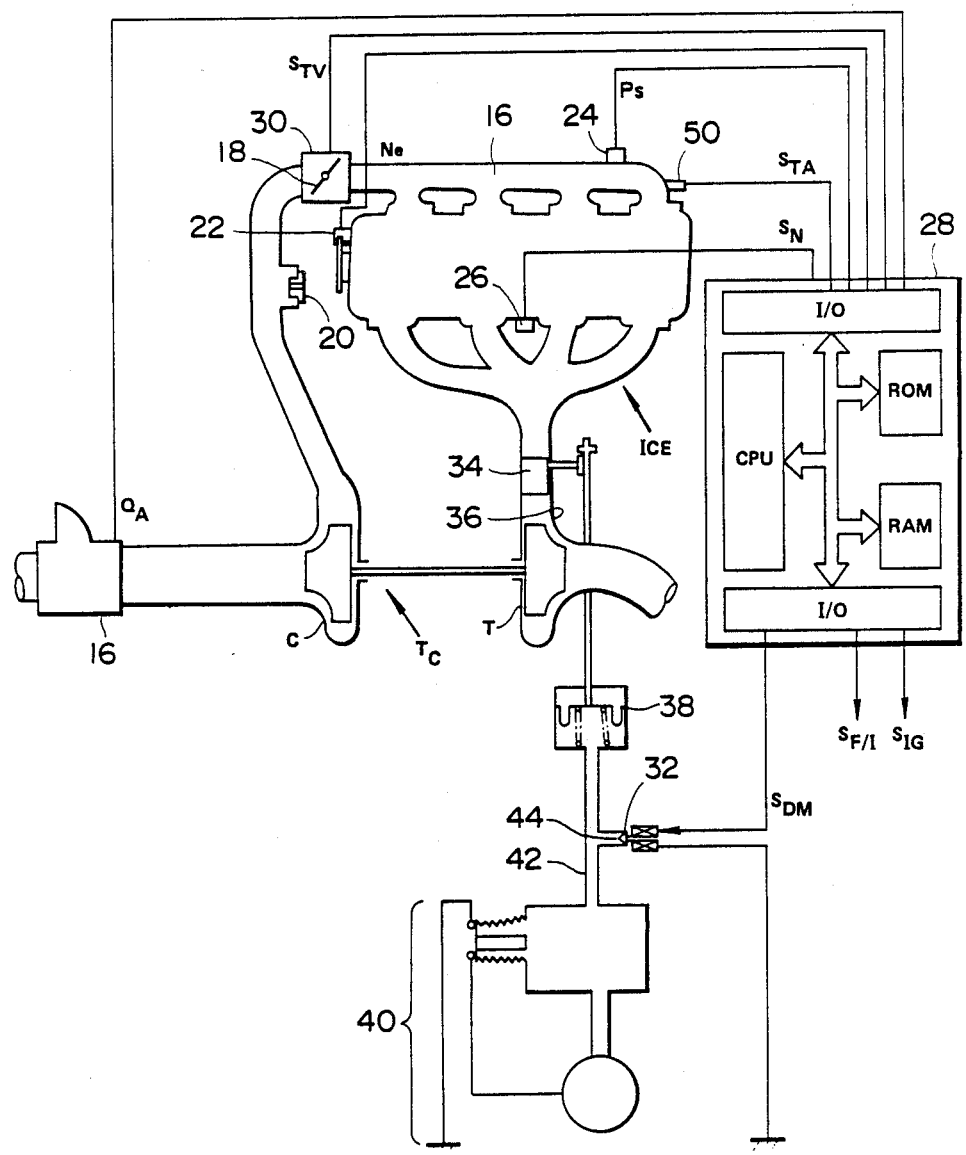
FIG. 5 is a schematic diagram of a engine system to which the present invention is applied.

FIG. 5 shows an engine system to which the present invention is applied and which includes apparatus by which the operation thereof is facilitated.

In this arrangement an internal combustion engine "ICE" is equipped with a turbocharger "TC". This turbocharger, as shown, includes a compressor "C" which is arranged to induct air via an air flow meter 16, compress same and discharge the compressed air into an induction manifold 16 via a throttle valve 18. Disposed in the induction passage upstream of the throttle valve 18 is a relief valve 20. This valve is, in accordance with the present invention, arranged to open only after a predetermined excessive pressure has prevailed in the induction manifold 16 for a predetermined period of time. The reason for this arrangement will become clear hereinafter. This feature of course can be achieved, by way of example, by using a dashpot arrangement which permits a valve element or the like, to move slowly from a home position to one in which a vent port is opened after an excessive pressure is sensed.

The engine is further equipped with an engine speed sensor 22, a supercharge pressure sensor 24, a knocking sensor 26 and a temperature sensor 50 which senses the temperature of the air being charged into the engine cylinders. A control circiut 28 which in this case includes a microprocessor (including input and output interfaces, a RAM, a ROM and a CPU) is arranged to receive signals $Q_A$, $S_{TV}$, $P_S$, $S_N$ & $S_{TA}$ from the air flow meter 16, a throttle position sensor 30, the supercharge pressure sensor 24, the knock sensor 26 and the temperature sensor 50, respectively. As will be appreciated these signals may be produced in digital form by the respective sensors or fed in analog form to a port of the read-in interface of the microprocessor which includes an A/D function.

The microprocessor is programmed to, in view of the above mentioned data inputs (and or others not shown), compute and generate suitable control signals $S_{DM}$, $S_{F/I}$ & $S_{IG}$, for controlling a vent valve 32, a fuel injection system and an engine ignition system.

In the illustrated arrangement, a suitable throttling member 34 is arranged to vary the capacity of the turbocharger turbine "T" in response to the operation of a vacuum motor 38. This motor is, as shown, connected to a constant vacuum source (generally denoted by the numeral 40) via a conduit 42 including a vent port 44 controlled by the aforementioned vent valve 32. In accordance with the rate of opening and closing (duty cycle) of the vent port, the degree of vacuum supplied to the vacuum motor 38 is controlled.

Figure 6:
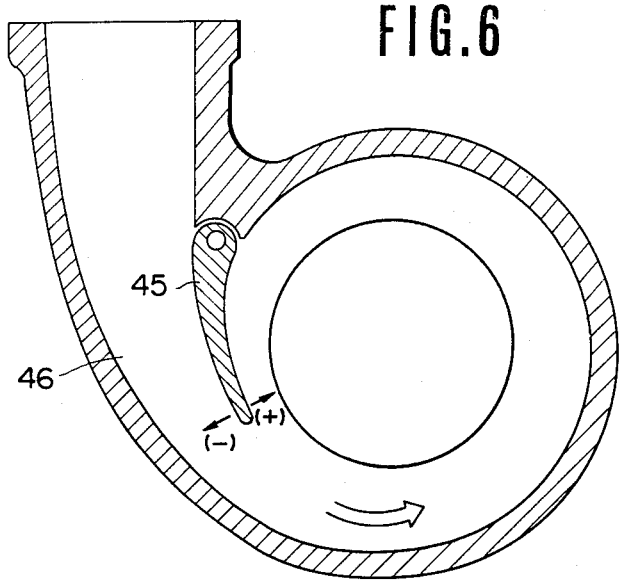
FIG. 6 is a sectional view of a turbocharger scroll housing equipped with a throttling arrangement which may be used in the engine system of FIG. 5.

FIG. 6 shows an example of an capacity varying arrangement which can be used in the present invention. In this device, a pivotal tongue 45 (viz., throttling member) is arranged to vary the cross sectional area of the throat or inlet port 46 of the scroll. In this figure the indications (+) and (−) respectively indicate the directions in which the positive torque generated by the incoming gas flow tends to move the tongue and increase the cross sectional area of the throat and the negative torque which tends to reduce said area. For the sake of explanation only, it will be assumed that the vacuum motor is connected to the tongue member 45 in a manner that an increase in the duty cycle of the signal applied to the solenoid of vent valve 38 will induce the movement of the throttling member (tongue 45) in a direction to reduce the cross sectional area of throat 46 and thus accelerate both the gas flow and turbine.

Examples of further arrangements suitable for use in lieu of the arrangement illustrated in FIG. 6 may be found in copending U.S. application Ser. No. 379,035 filed in May, 17 1982 in the name of Hiroshi KOMATSU.

Figure 7:
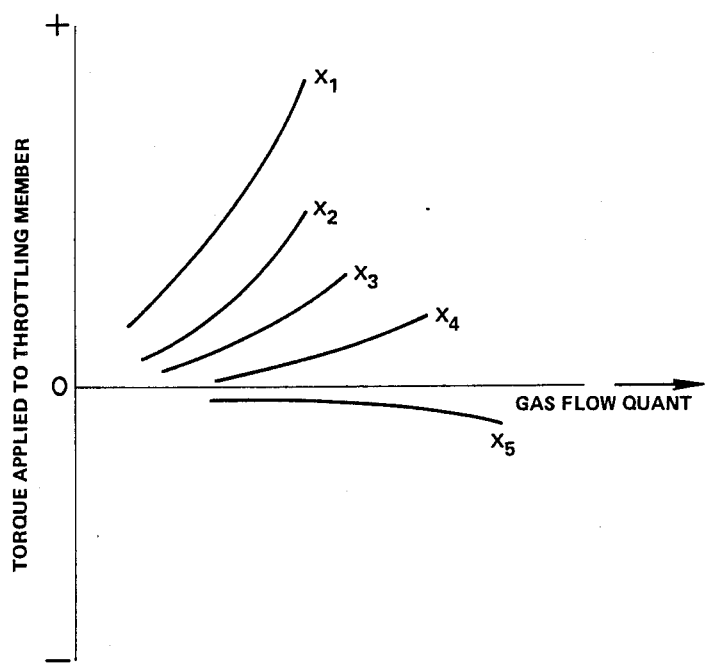
FIG. 7 is a graph showing, in terms of torque applied to the throttling member used to vary the capacity of the turbine and the amount of gas flowing therepast, the variation in force applied to the throttling arrangement by the exhaust gas flow.

FIG. 7 shows, in graphical form, the variation of torque applied to the throttling member (viz., traces X1–X5) with the change in amount of gas passing through the scroll. As will be appreciated, even though the throttling member (tongue 45) may be initially moved to a given desired throttling position, during acceleration in particular, as the amount of gas flowing though the scroll increases, the torque applied to the throttling member will increase and move same against the bias applied by the vacuum motor to a different position. Moreover, even if the throttling member is maintained in position, as the gas flow increases under acceleration, the temperature and pressure produced by the turbocharger will still vary. Accordingly, constant feedback control is vital in order to maintain the desired operational characteristics.

Figure 8:
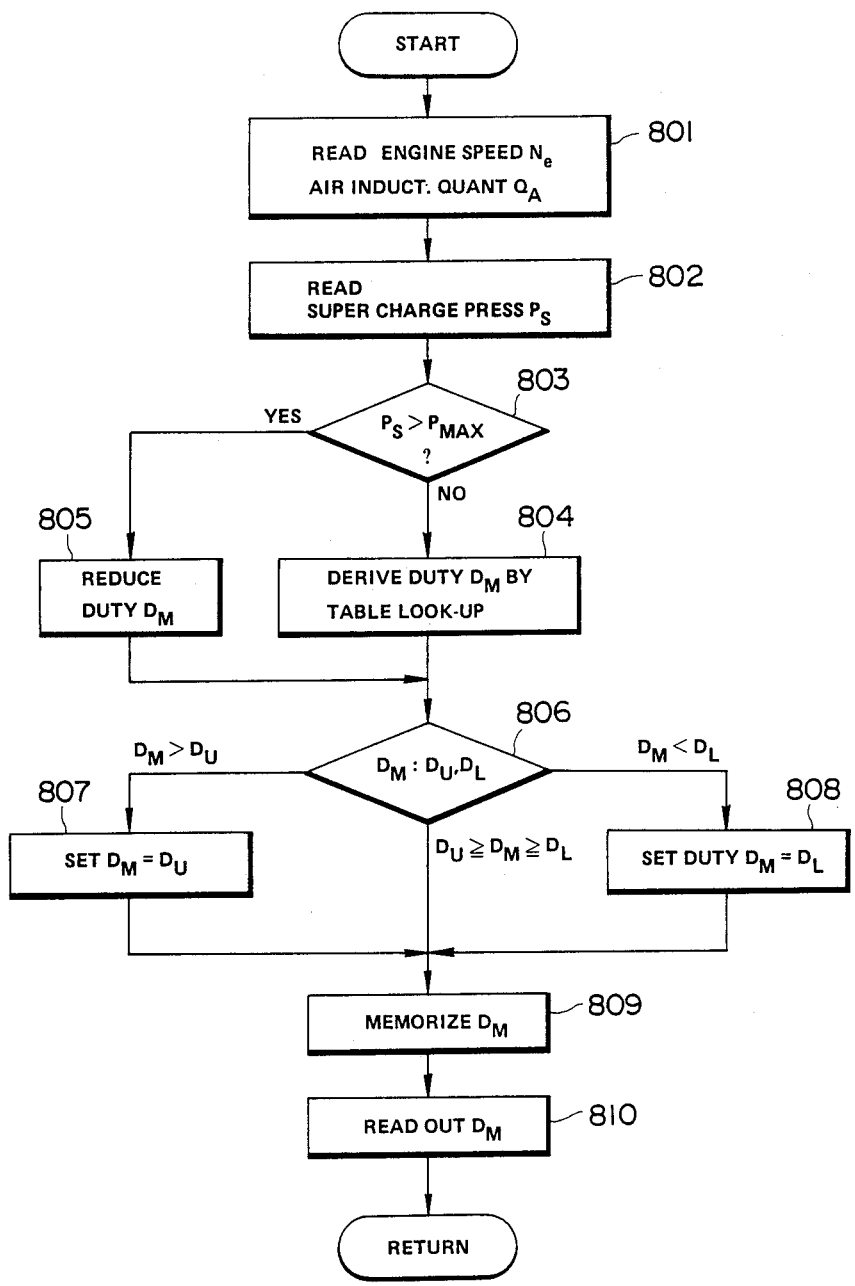
FIGS. 8 to 12 are flow charts which express the characteristic steps of first to fifth embodiments of the present invention.

FIG. 8 shows, in flow chart form, a first embodiment of the present invention. As will be appreciated this embodiment of the present invention seeks to control the position of the throttling member (via varying the duty cycle of the vent valve control signal $S_{DM}$) in a manner to maintain the supercharge pressure at an optimal level for the given mode of engine operation, by using the supercharge pressure per se as a feedback control factor. This allows for the elimination of a preset maximum throttling value (CL) inherent in the prior art and allows the maximum possible throttling to take place until an experimentally predetermined critical pressure is reached whereafter the throttling is reduced little by little until just under that critical pressure. This of course allows for unexpectedly high pressures which may occur due to unexpectedly high supercharge temperatures.

More specifically, subseqent to the START of the program, the necessary data such as engine speed $N_e$, the amount of air being inducted to the engine $Q_A$ and the supercharge pressure $P_S$ are read in steps 801 and 802. In step 803 the instantaneous supercharge pressure $P_S$ is compared with a predetermined maximim reference pressure $P_{MAX}$. This pressure is experimentally determined in view of the type of engine, the knocking limit of the engine, etc. If the supercharge pressure is lower than the maximum permissible value, then the program proceeds to step 804 wherein a table look-up of the optimal control signal duty cycle $D_M$ is performed. In this embodiment by way of example, the table is mapped in terms of engine speed $N_e$ and the amount of air inducted per unit rotation of the engine - $Q_A/N_e$. However, if the supercharge pressure is detected at step 803 as being above $P_{MAX}$, then the program proceeds to step 805 wherein the value of the duty cycle $D_M$ is incrementally reduced.

Following steps 804 and 805 "ranging" is effected to ensure that the duty cycle to be used to operate the vent valve is not out of a predetermined allowable range. For example, if the duty cycle exceeds 100% the desired control of the turbocharger is apt to be lost, microprocessor chip LSI is apt to be damaged by noise and/or the vent valve 38 per se may be damaged.

This ranging (steps 806-808) holds the value of $D_M$ within a range defined between an upper limit $D_U$ and a lower limit $D_L$. At step 809 the newly derived $D_M$ value is stored in the RAM of the microprocessor and read out through the read out interface at step 810 in a suitable form for application to the vent valve 38.

Figure 9:
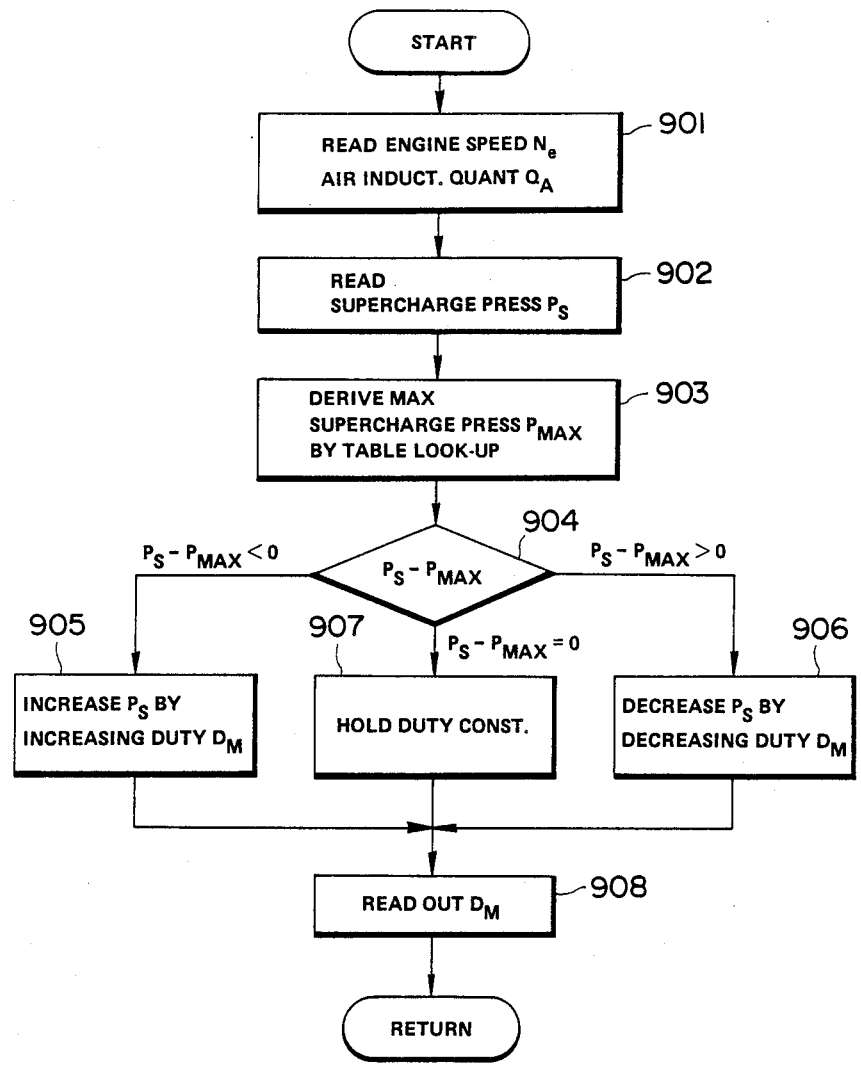

FIG. 9 shows, in flow chart form, a second embodiment of the present invention. This embodiment differs from the first in that the optimal supercharge pressure is obtained by table-look up rather than the appropriate duty cycle. Viz., subsequent to START, engine speed $N_e$, air induction quantity $Q_A$ and supercharge pressure $P_S$ are read in steps 901 and 902. In step 903 the maximum supercharge prssure $P_{MAX}$ for the given set of operational conditions is obtained by table look-up. In step 904 the instantaneous supercharge pressure $P_S$ is compared with the value looked-up in step 903 and in the event that the pressure is less than that permitted under such conditions, the duty cycle $D_M$ of the control signal $S_{DM}$ is increased by a predetermined small increment (step 905) to induce a corresponding small increase in pressure $P_S$. On the other hand, if the difference between the instantaneous pressure and the looked-up value amounts to a positive value, then at step 906 the duty $D_M$ is reduced by a predetermined increment. If the difference in pressure is zero, then the duty cycle $D_M$ is held constant (step 907). At step 908 the newly derived duty cycle value $D_M$ is readout.

Figure 10:
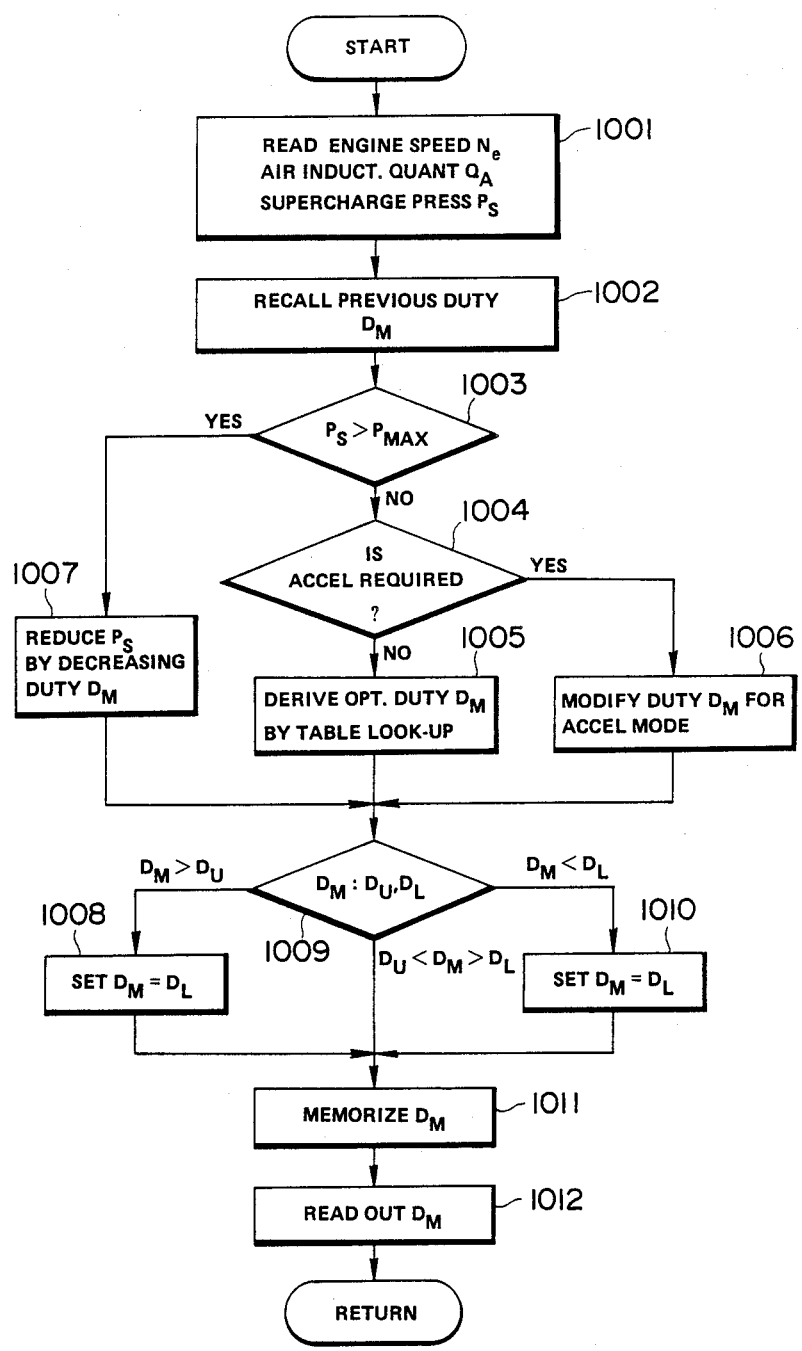

FIG. 10 shows a third embodiment of the present invention. In this embodiment consideration as to whether there is a demand for engine acceleration is given thus distinguishing transitory and non-transitory modes of operation.

More specifically, in this embodiment after reading the engine speed $N_e$, air induction amount $Q_A$ and supercharge pressure $P_S$ (step 1001), the program proceeds to recall from the RAM the value of the $D_M$ memorized in the previous cycle. Subsequently, in step 1003 the instantaneous supercharge pressure $P_S$ is compared with a predetermined maximum allowable value $P_{MAX}$. Given that the supercharge pressure is still below the maximum permissible level, the program proceeds to step 1004, wherein it is ascertained whether there is a demand for acceleration. This may be ascertained by reading the throttle position signal and determining whether the value of this signal is changing (in the opening direction) faster than a predetermined rate. Alternatively, the throttle position sensor may be arranged to output a signal only upon the rate of opening movement thereof exceeding a predeterminded rate and the presence of this signal used to indicate the need or requirement for acceleration. If the outcome of this inquiry is negative and acceleration is not required, then the program goes to step 1005 wherein a table look-up of the optimum duty cycle $D_M$ for the instantaneous set of circumstances is carried out.

If there is a demand for engine acceleration detected at step 1004, the program goes to step 1006 wherein the duty cycle $D_M$ is increased to a predetermined value suited for inducing the throttling arrangement to move in a direction which induces an amount of throttling selected to rapidly induce the maximum rate of acceleration of the turbocharger turbine. This acceleration duty cycle will be maintained as long as the demand for acceleration is sensed or the supercharge pressure raises to the above mentioned $P_{MAX}$ level. Viz., should the supercharge pressure be detected as being above $P_{MAX}$ at step 1003 on the next run, then the program will go to step 1007 wherein the duty cycle value will be incrementally reduced in a manner to induce a corresponding reduction in $P_S$. Alternatively, the duty cycle suited for acceleration modes may be amintained for a predetermined period as will be explained hereinafter.

Steps 1008 to 1010 define a ranging process used to ensure that the duty cycle value stored in step 1011 is not apt to induce LSI damage or valve damage.

Figure 11:
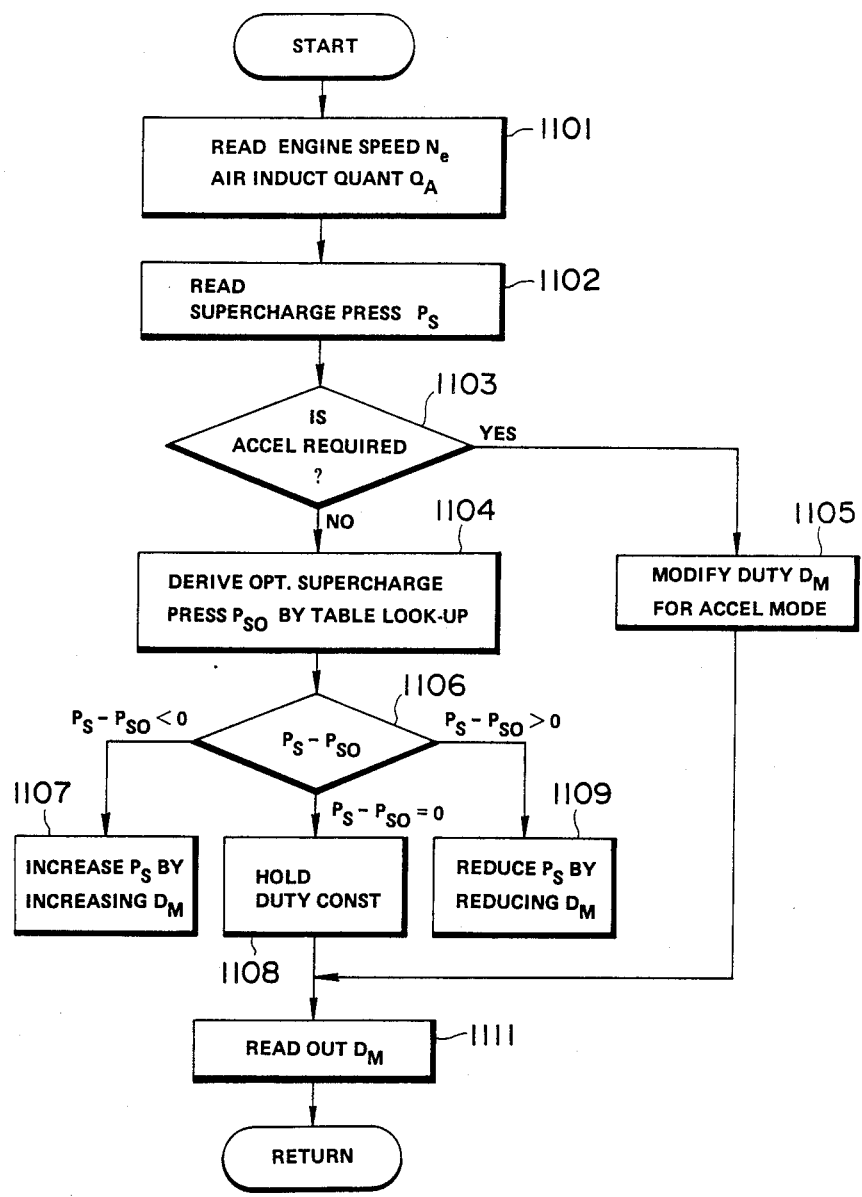

The embodiment of FIG. 11 is deemed selfexplanatory and as such a detailed explanation will be omitted for the sake of brevity. As will be apparent, each of the steps 1101 to 1111 are similar in basic concept to those used in the previously described embodiments.

Figure 12:
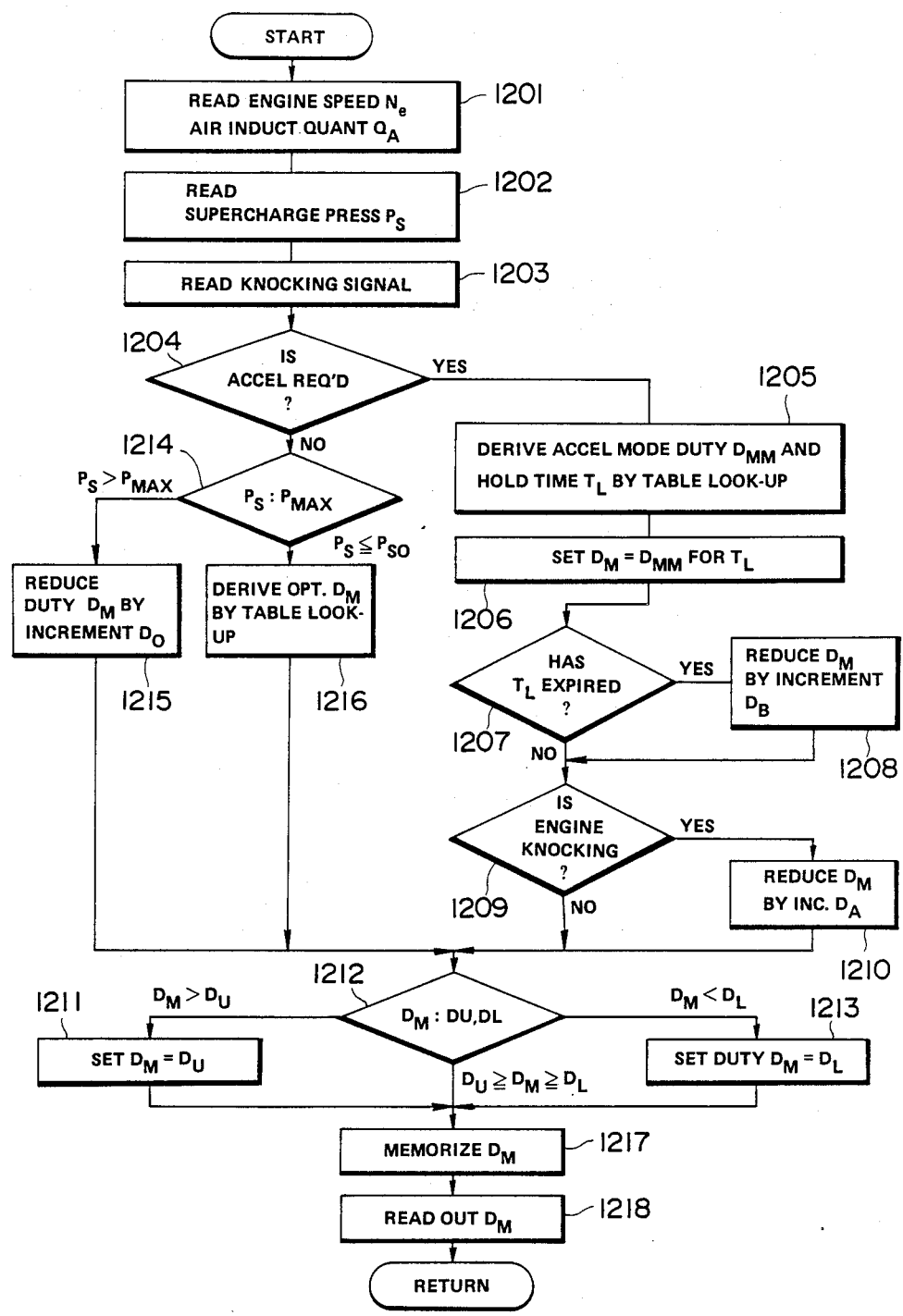

The embodiment illustrated in FIG. 12 differs from those previously disclosed in that if acceleration is detected as being required, the program in step 1205 performs a table look-up to derive the appropriate duty cycle value $D_{MM}$ for the given set of conditions along with a hold time $T_L$ for which the $D_{MM}$ value should be maintained. This hold time is selected to be always shorter than the period for which the relief valve 20 will remain closed after an excessive pressure is sensed thereby. The reason that this hold time is used is that, during acceleration the temperature of the induction system tends to lower as compared with cruising modes, due to the relatively large quantity of air which passes through the engine in a short period. Accordingly, it is possible to temporarily exceed normal temperature and pressure limits during acceleration. This enables the temperature and pressure of the air being charged into the cylinders to be rapidly raised in a manner to shorten the acceleration period without actually damaging the engine per se. However, as a safeguard the program provides for a reduction of the supercharge pressure even if the hold time $T_L$ has not completely expired. Viz., following step 1206 wherein the duty cycle $D_{MM}$ and hold time $T_L$ values (which have been looked-up in step 1205) are implemented, an inquiry is made in step 1207 to determine whether the hold time $T_L$ has expired or not. If the time has expired, then the program goes to step 1208 wherein the supercharge pressure is reduced by reducing the duty cycle by a predetermined amount $D_B$. In step 1209 if the engine is knocking, then the program shifts to step 1210 wherein the duty cycle is incrementally reduced irrespective of the fact that the hold time $T_L$ has not yet expired. However, if the engine is not knocking, then the program goes on to steps 1211 to 1213 wherein ranging is effected to ensure that dangerously high or low duty cycle values are not accidentally read out.

In the event that acceleration is indicated as not being required in step 1204, then the program in this embodiment goes to step 1214 wherein the instantaneous supercharge pressure $P_S$ is compared with a predetermined maximum allowable pressure $P_{MAX}$. If the outcome of this comparison reveals that the instantaneous pressure is above the maximum allowable value then the program goes to step 1215 wherein the value of the duty cycle is reduced by an increment $D_O$. On the other hand, if the pressure is lower than the maxium allowable value then the program moves on to step 1216 wherein a table look-up is performed to derive the optimal $D_M$ value for the instantaneous set of conditions.

In steps 1217 and 1218, value of $D_M$ derived in the preceeding steps is stored in memory and read-out, respectively.

Figure 13:
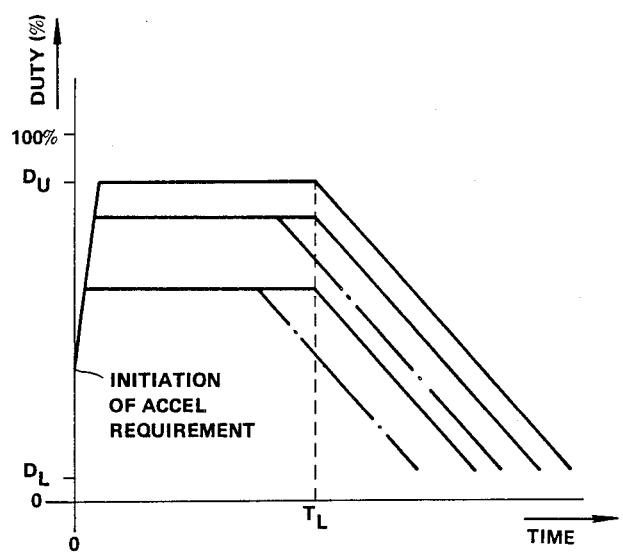
FIG. 13 shows, in terms of the duty cycle used to control the position of the throttling member and time, the throttling characteristics achieved by the third embodiment during acceleration modes of operation.

FIG. 13 shows in graphical form the schedule(s) according to which the duty cycle is controlled during the initial phase of the acceleration mode. As shown, subsequent to the demand for acceleration being detected, the duty cycle value $D_M$ is rapidly increased. Depending on the instantaneous operating conditions, the level to which the duty cycle value is raised varies. For example, if there is a substantial amount of exhaust gas flowing through the scroll passage (e.g. medium-high engine speed operation), the degree to which the passage may be safely throttled will be lower than that at low engine speeds when the exhaust gas flow is markedly reduced.

After the expiration of the hold time $T_L$ the value of $D_M$ is decreased. The decrease is actually effected stepwise by small increments, however for the ease of illustration the decrease is shown as being essentially continuous. It will be appreciated that $T_L$ may either be a set value, as illustrated by the bold line schedules, or variable such with engine speed, as shown by the schedules illustrated in phantom.

It will be further appreciated that the holding of a given $D_M$ value suited for acceleration modes can also be implemented in steps 1006 and 1105 of the embodiments shown in FIGS. 10 and 11, respectively.

It should be noted at this time that the programs which embody the present invention are preferably run once per engine revolution or once per unit time. Further, between each run of a duty cycle determination program it is deemed advantageous to compute and issue other vital control signals such as $S_{F/I}$ and $S_{IG}$. Viz., use the microprocessor facilities on a time sharing basis. As this particular aspect of programming is well known no further comment will be made, for the sake of brevity.

Figure 14:
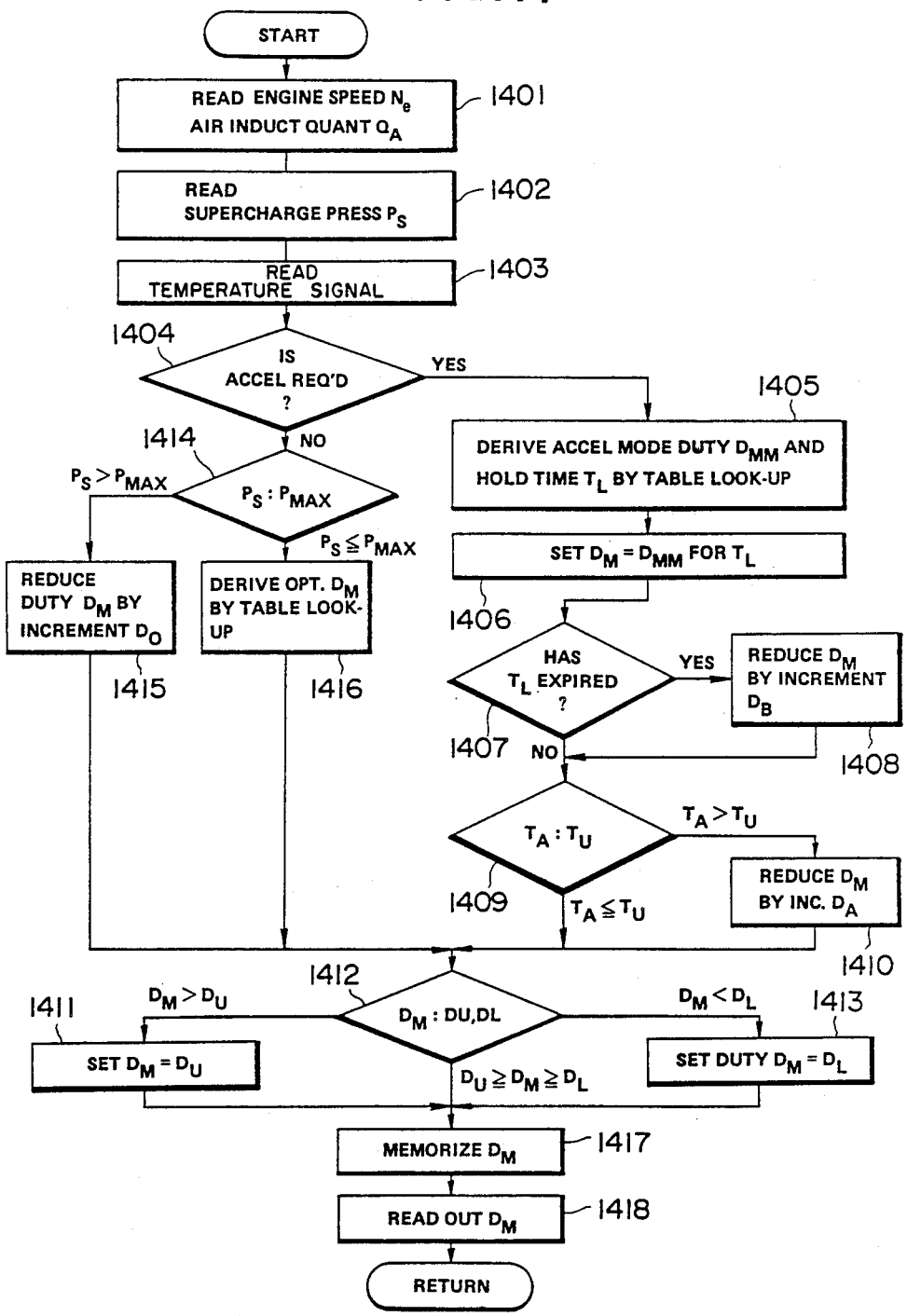
FIGS. 14 and 15 are flow charts according to sixth and seventh embodiments of the present invention.

The embodiment of the present invention shown in FIG. 14 is essentially the same as that described in connection with FIG. 12 and differs basically in that in step 1409 the temperature $T_A$ of the air being supercharged into the engine cylinders is compared with a predetermined maximum value $T_U$ in place of the previously described knocking signal.

Figure 15:
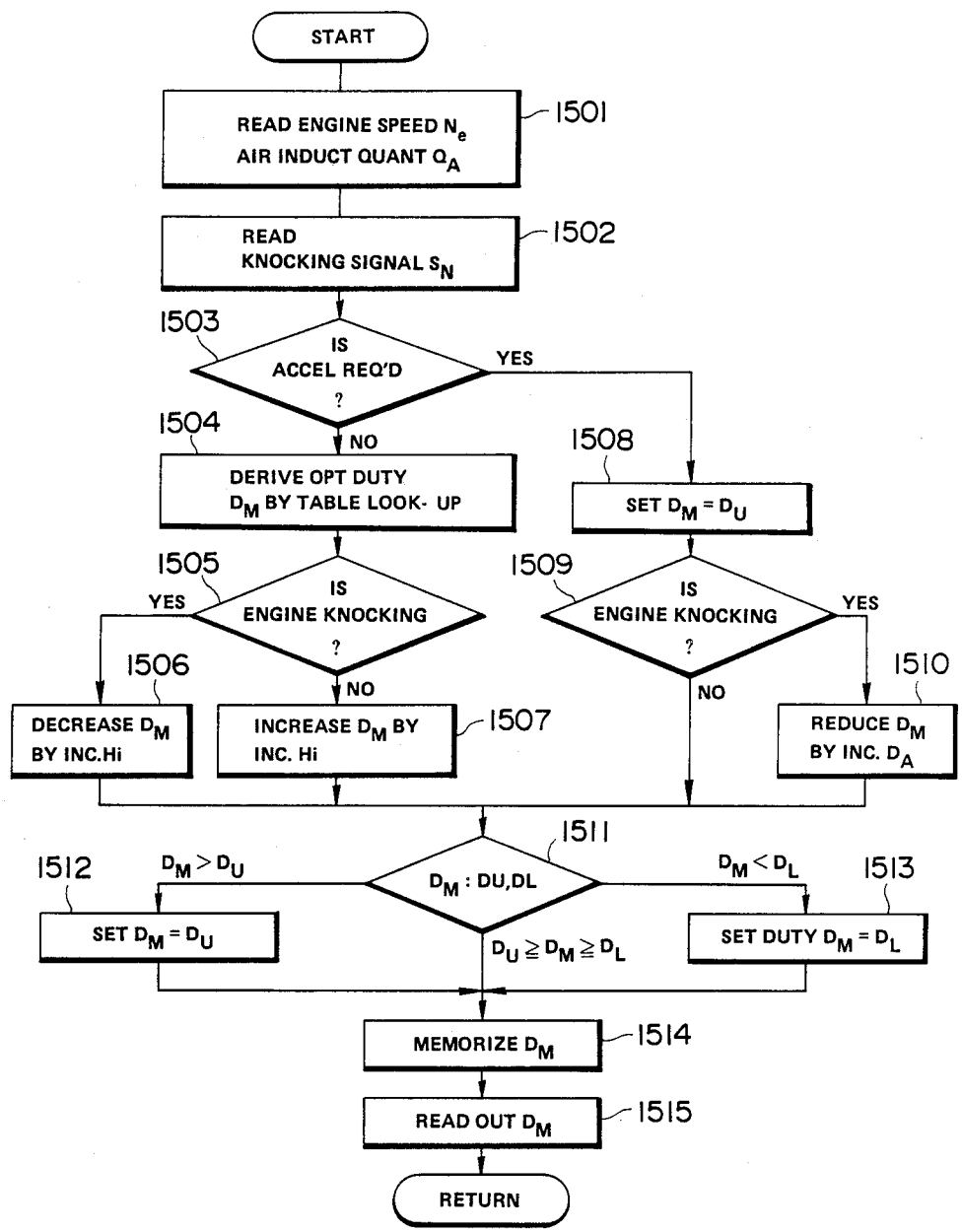

FIG. 15 shows a seventh embodiment of the present invention. In this embodiment, under non-transitory engine operation, the supercharge pressure is gradually raised until engine knocking is detected and thereafter incrementally decreased in a manner to maintain the supercharge pressure at a maximum possible level (viz., on the threshold of engine knocking). That is to say, if acceleration is sensed as not being required at step 1502, then the program in this embodiment goes to step 1504 wherein a table look-up is performed to determined the appropriate value of $D_M$ for the instant set of conditions. Thereafter, in step 1505 the inquiry is made as to whether the engine is knocking or not. If the answer is NO, and the engine is not in fact knocking, then the value of $D_M$ is increased by an increment Hi in step 1506. Conversely, if the engine is knocking and the answer to the inquiry made in step 1505 is YES, then the value of $D_M$ is reduced by an increment Hi.

In the event that acceleration is indicated as being required in step 1503, the program goes to step 1507 wherein the value of $D_M$ is boosted to the maximum allowable value $D_U$. Alternatively, a table look-up such as disclosed in connection with step 1205 (see FIG. 12) can be executed and the acceleration mode controlled in accordance with engine knocking or supercharge temperature.

Figure 16:
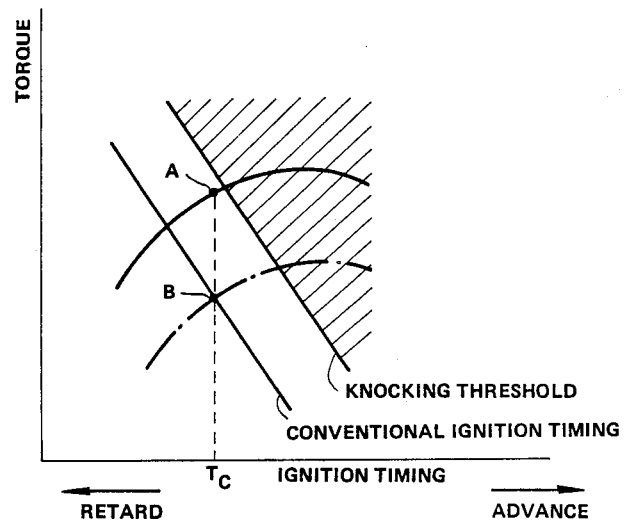
FIG. 16 shows in graphical form, the merits derivable with the present invention.

FIG. 16 shows in graphical form some of the advantages derivable with the present invention. In this figure the solid line curve represents the engine torque characteristics provided by the present invention while the chain line curve denotes those obtained with the prior art. As will be appreciated, even if the ignition timing is set at a relatively retarded value Tc (for example a value to which ignition timing is often reduced with prior art control systems to obviate engine knocking), still the amount of torque derivable with the present invention (see point A) is greater than that derivable with the prior art control (see point B). Furthermore, with the present invention the supercharge pressure can be raised to limits heretofore not possible. Combustion efficiency and fuel economy, particularly during partial load operation, are markedly improved.

Although the embodiments of the present invention have been disclosed in connection with a signal which controls the vacuum supplied to vacuum motor 38, it will be appreciated that the position of the throttling member may be controlled by a stepping motor or the like. In this alternative the duty cycle control parameter would be replaced with a position or opening degree parameter.

The various other modifications which can be made to the present invention without departing from the scope thereof will be readily apparent to those skilled in the art to which the present invention pertains.

What is claimed is:

1. In a method of controlling an internal combustion engine turbocharger which includes a volute passage through which exhaust gases flow from an internal combustion engine associated with said turbocharger and means for throttling said passage in a manner to vary the supercharging capacity of said turbocharger, the steps of:

(a) sensing a first engine operational parameter;

(b) sensing a second engine operational parameter which varies with the supercharging of said engine;

(c) generating a control signal $S_{DM}$ for controlling said throttling means in response to the magnitude of said first parameter;

(d) modifying said control signal in response to the magnitude of said second parameter;

(e) sensing the demand for engine acceleration;

(f) modifying said control signal in response to said demand for acceleration in a manner to cause said throttling means to increase the throttling of said passage to at least a predetermined degree until a predetermined event occurs;

(g) modifying said control signal in response to the occurrence of said event until said event terminates;

(h) maintaining, in the absence of said event, the modification of said control signal derived in step (f) for a predetermined period of time; and (i) varying said predetermined period of time in response to a selected operational parameter.

2. In an internal combustion engine a turbocharger having a volute passage through which exhaust gases of said engine flow;

means for throttling said passage so as to vary the supercharging capacity of said turbocharger;

means for sensing a first engine operational parameter;

means for sensing a second operational parameter which varies with the supercharging of said engine;

means for generating a control signal for controlling said throttle means in response to the magnitude of said first parameter;

means for modifying said control signal in response to the magnitude of said second parameter;

means for sensing a demand for engine acceleration;

means for modifying said control signal in response to said demand for acceleration so as to cause said throttling means to increase the throttling of said passage at least to a predetermined degree until a predetermined event occurs;

means for modifying said control signal in response to the occurrence of said event until said event terminates;

means for maintaining in the absence of said event, the modification of said control signal derived in response to the demand for acceleration, for a predetermined period of time; and means for varying said predetermined period of time in response to a selected engine operation parameter.

3. In a method of controlling an internal combustion engine turbocharger which includes a passage through which exhaust gases flow from an internal combustion engine associated with said turbocharger and means for throttling said passage in a manner to vary the supercharging capacity of said turbocharger, the steps of:

sensing a first engine operational parameter;

sensing a second engine operational parameter;

storing a turbocharger control signal schedule in a memory, said turbocharger control signal schedule being defined in terms of said first and second parameters;

generating a control signal for controlling said throttling means using the stored control schedule and the values of said first and second operational parameters;

sensing the occurrence of a predetermined event;

directly sensing a third parameter which varies with the super-charging of said engine; and modifying the value of said control signal using said third parameter when the occurrence of said predetermined event is sensed.

4. A method as claimed in claim 3 wherein said third parameter takes the form of one of the pressure and the temperature of the supercharging air.

5. A method as claimed in claim 3 further comprising the steps of:

comparing the instant value of said control signal with a predetermined range; and modifying the value of said control signal in the event that the value of said control signal is out of said predetermined range in a manner which tends to bring it into said predetermined range.

6. A method as claimed in claim 3 wherein said step of modifying is executed during transitory modes of engine operation.

7. In a method of controlling an automotive vehicle internal combustion engine turbocharger, the steps of:

(a) sensing the rotational speed of the engine;

(b) sensing a parameter which is indicative of the load on the engine;

(c) sensing the supercharging pressure being generated by the turbocharger;

(d) storing a first predetermined control schedule of different values in a memory;

(e) using the first stored control schedule to derive a control signal in response to at least one of the values sensed in steps (a) to (c);

(f) controlling the operation of a device which varies the capacity of the turbocharger using said control signal;

(g) sensing the occurrence of a first predetermined event;

(h) modifying the value of said control signal in the event that the occurrence of said first predetermined event is detected and (i) storing a second predetermined schedule of different values in a memory, said first predetermined event taking the form of a transitory mode of engine operation wherein increased engine power output for vehicle acceleration is required, said step of modifying including the steps of:

using said second predetermined schedule to determine a control signal value for the required transitory mode of engine operation; and using the control signal value derived by using the second stored predetermined schedule in place of that derived in step (c) until the occurrence of a second predetermined event.

8. A method as claimed in claim 7, wherein said second predetermined event is the expiration of a predetermined period of time.

9. A method as claimed in claim 7, wherein said second predetermined event is the expiration of a predetermined period of time and the detection of engine knock.

10. A method as claimed in claim 8, wherein said predetermined period of time is variable in response to the values determined in one or more of steps (a), (b) and (c).

11. A method as claimed in claim 9, wherein said predetermined period of time is variable in response to the values detected on one of more of steps (a), (b) and (c).

12. In an automotive vehicle:

an internal combustion engine equipped with a turbocharger, said turbocharger having a passage through which exhaust gases from said engine flow;

first sensing means for sensing the rotational speed of the engine;

second sensing means for sensing a parameter which is indicative of the load on the engine;

third sensing means for sensing the supercharging pressure being generated by the turbocharger;

a memory for storing a first predetermined control schedule of different values;

means for deriving a control signal using the first control schedule and at least one of the values sensed by said first, second and third sensing means;

a device which varies the capacity of the turbocharger;

means responsive to said control signal for controlling the operation of said device;

means for detecting the occurrence of a first predetermined event and means for modifying the value of said control signal when the occurrence of said first predetermined even is detected;

a memory for storing a second predetermined schedule of different values; and means for detecting a second predetermined event, said first predetermined event detecting means including means for detecting a transitory mode of engine operation wherein increased engine power output for vehicle acceleration is required, and said modifying means including:

means for using said second predetermined schedule to determine a control signal value for the required transitory mode of engine operation; and means for using the control signal value derived by using said second predetermined schedule in place of that derived using said first predetermined schedule until the occurrence of a second predetermined event is detected by said second predetermined event detecting means.

13. An internal combustion engine as claimed in claim 12, wherein said second predetermined event detection means comprises means for detecting the expiration of a predetermined period of time from the time when said second predetermined event is detected.

14. An internal combustion engine as claimed in claim 12, wherein said second predetermined event detection means includes means for detecting the expiration of a predetermined period of time from the time when the second predetermined event is detected and means for detecting engine knock.

15. An internal combustion engine as claimed in claim 13, wherein said predetermined time is variable in response to the values detected by one or more of said engine rotational speed sensor means, said load indicative parameter sensing means and said supercharge pressure detecting means.

16. In a method of controlling an automotive vehicle internal combustion engine turbocharger of the variable capacity type, wherein all of the exhaust gases from the engine pass through a housing in which the impeller of the turbocharger is disposed, the steps of:

(a) sensing the rotational speed of the engine and producing a first signal indicative thereof;

(b) sensing a parameter which is indicative of the load on the engine and producing a second signal indicative thereof;

(c) directly sensing the supercharging pressure being generated by the turbocharger and producing a third signal indicative thereof;

(d) storing a first predetermined control schedule in a memory;

(e) using the first stored control schedule to derive a control signal in response to at least one of the values of said first, second and third signals sensed in steps (a) to (c);

(f) controlling the operation of a device which varies the capacity of the turbocharger using said control signal;

(g) sensing the occurrence of a first predetermined event; and (h) modifying the value of said control signal in the event that the occurrence of said first predetermined event is detected.

17. A method as claimed in claim 16 wherein said predetermined event takes the form of a requirement for increased engine power output for vehicle acceleration and said modifying step modifies the value of said control signal to a predetermined value.

18. A method as claimed in claim 16 wherein said step of modifying is executed during transitory engine operation.

19. A method as claimed in claim 16 wherein said step of modifying is executed during both transitory and nontransitory engine operation.

20. A method as claimed in claim 16 further comprising the steps of:

comparing the instant turbocharging pressure with a maximum permissible value; and modifying said control signal in the event that the instant turbocharging pressure is above said maximum permissible value irrespective of the occurrence of said first predetermined event.

21. A method as claimed in claim 16 further comprising the steps of:

comparing the instant value of said control signal with a predetermined range; and modifying the value of said control signal in the event that the value of said control signal is out of said predetermined range in a manner which tends to bring it into said predetermined range.

22. A method as claimed in claim 16 wherein said first predetermined event takes the form of the instant supercharging pressure exceeding a predetermined maximum permissible value.

23. A method as claimed in claim 16 wherein said first predetermined event takes the form of the occurrence of a difference between instant supercharging pressure and a predetermined maximum permissible value.

24. A method as claimed in claim 16, wherein said predetermined event takes the form of a maximum permissible supercharging pressure being detected in said step (c), and said step of modifying incrementally reduces the value of said control signal until the supercharging pressure detected in step (c) is immediately below said maximum permissable limit.

25. In an automotive vehicle:

an internal combustion engine equipped with a turbocharger of a variable capacity type, said turbocharger having an impeller disposed in a housing through which all of the exhaust gases from said engine flow;

means for sensing the rotational speed of the engine and producing a first signal indicative thereof;

means for sensing a parameter which is indicative of the load on the engine and producing a second signal indicative thereof;

means for directly sensing the supercharging pressure being generated by the turbocharger and producing a third signal indicative thereof;

a memory for storing a first predetermined control schedule;

means for receiving said first, second and third signals and for deriving a control signal using the first control schedule and at least one of said first, second and third signals;

a device which varies the capacity of the turbocharger;

means responsive to said control signal for controlling the operation of said device;

means for detecting the occurrence of a first predetermined event; and means for modifying the value of said control signal when the occurrence of said predetermined event is detected.

26. An internal combustion engine as claimed in claim 25, wherein said predetermined event detecting means comprises means for detecting the requirement for increased engine power output for vehicle acceleration and wherein said modifying means includes means for modifying the value of said control signal to a predetermined value.

27. An internal combustion engine as claimed in claim 25, wherein: said predetermined event sensing means detects a maximum permissible supercharging pressure prevailing downstream of said turbocharger; and wherein said modifying means includes means for incrementally reducing the value of said control signal until the supercharging pressure is immediately below said maximum permissible limit.

* * * * *